(12) United States Patent
Ballard et al.

(10) Patent No.: US 8,442,035 B2
(45) Date of Patent: May 14, 2013

(54) METHOD AND DEVICE FOR GRANDPARENT MEDIA REALM FOR SESSION BORDER CONTROLLERS

(75) Inventors: Stephen Ballard, Plano, TX (US); Bill Kewin, Rowlett, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1331 days.

(21) Appl. No.: 11/947,112

(22) Filed: Nov. 29, 2007

(65) Prior Publication Data

US 2009/0141878 A1 Jun. 4, 2009

(51) Int. Cl.
*H04L 12/66* (2006.01)
*H04M 11/00* (2006.01)
*H04M 1/24* (2006.01)

(52) U.S. Cl.
USPC .............. 370/352; 455/405; 455/408; 379/35

(58) Field of Classification Search ..... 370/352; 379/35; 455/405, 408
See application file for complete search history.

(56) References Cited

U.S. PATENT DOCUMENTS

| 7,151,772 | B1* | 12/2006 | Kalmanek et al. | 370/390 |
| 2002/0009973 | A1* | 1/2002 | Bondy et al. | 455/67.2 |
| 2003/0233471 | A1* | 12/2003 | Mitchell et al. | 709/238 |
| 2006/0146792 | A1* | 7/2006 | Ramachandran et al. | 370/352 |
| 2007/0019619 | A1* | 1/2007 | Foster et al. | 370/352 |

OTHER PUBLICATIONS

Sen et al., Identifying Intra-realm Calls using STUN, Sep. 2002, SIPPING Working Group.*
Aoun et al., Identifying intra-real calls and Avoiding media tromboning, Feb. 2002, MIDCOM Working Group.*

* cited by examiner

*Primary Examiner* — Asad Nawaz
*Assistant Examiner* — Nicholas Jensen

(57) ABSTRACT

A method may include receiving handshake signals to establish a media session between at least two endpoints, determining location information of the at least two endpoints based on the handshake signals, and releasing media exchanged between the at least two endpoints if it is determined that the location information of the at least two endpoints indicates that the at least two endpoints are in a same location.

22 Claims, 5 Drawing Sheets

US 8,442,035 B2

METHOD AND DEVICE FOR GRANDPARENT MEDIA REALM FOR SESSION BORDER CONTROLLERS

BACKGROUND

In some VoIP networks, a session border controller (SBC) may be employed for managing signaling and/or media streams. A SBC may anchor media (e.g., a VoIP call) to a service provider network so that the media may be diverted for various reasons (e.g., quality control, diagnostic testing, or the Communications Assistance for Law Enforcement Act (CALEA)). However, a SBC may unnecessarily anchor media between two endpoints (e.g. two telephones) that are in one location (e.g., a building) because of separate signaling realms. For example, a customer may utilize multiple private branch exchanges (PBXs) in a building, where each PBX may be connected to a corresponding enterprise gateway. In this framework, each enterprise gateway may have its own signaling realm which may cause the SBC to anchor the VoIP call to the service provider network. As a result, bandwidth associated with a service provider's network may be unnecessarily wasted.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Implementations described herein may provide a SBC having configuration components to allow for media release in instances where distinct signaling realms may exist for one location. The term "component," as used herein, is intended to be broadly interpreted to include software, hardware, or a combination of hardware and software. Additionally, although the Session Initiation Protocol (SIP) may be mentioned in reference to an implementation associated with the concepts described herein, other layer five IP signaling protocols may be employed (e.g., H.323, Media Gateway Control Protocol (MGCP), and/or Megaco/H.248). Accordingly, the concepts described herein are not dependent on employing a particular protocol.

Figure 1:
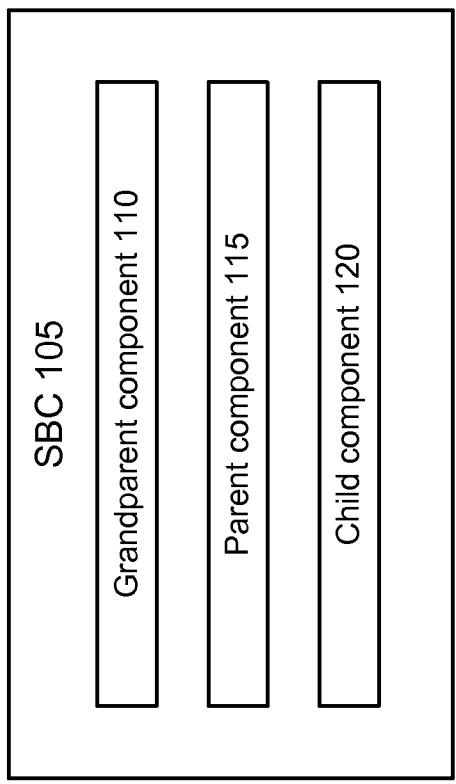
FIG. 1 is a diagram illustrating concepts described herein.

FIG. 1 is a diagram illustrating concepts described herein. As illustrated, an exemplary SBC 105 may include exemplary configuration components, such as a grandparent component 110, a parent component 115, and a child component 120. In one implementation, grandparent component 110, parent component 115, and child component 120 may have a hierarchical relationship. That is, for example, the characteristics of grandparent component 110 may be inherited by parent component 115 and/or child component 120. However, one or more characteristics inherited from grandparent component 110 may be overridden by parent component 115 and/or child component 120.

In one implementation, grandparent component 110 may operate as a shared media steering pool for all clients and may be enabled to anchor media for purposes of (e.g., quality control, diagnostic testing, the CALEA). Although parent component 115 may inherit this characteristic (i.e., to anchor media), if parent component 115 is enabled to release media, then the inherited characteristic to anchor media may be overridden and media may be released (i.e., not anchored). In one instance, parent component 115 may release media when distinct signaling realms, which may be associated with two endpoints, exist for one location.

For example, child component 120 may correspond to configuration information associated with two endpoints that are enabled to release media and require separate signaling realms to SBC 105. Parent component 115 may determine that child component 120 relates to two endpoints in one location based on, for example, port mapping information. Thus, SBC 105 may release media in instances when endpoints are in the same location, even though each endpoint requires a separate signaling realm to communicate with SBC 105. Additionally, in instances when endpoints are in different locations, grandparent component 110 may anchor media in compliance with the CALEA or for other purposes.

As a result of the foregoing, a VoIP network including a SBC, like SBC 105, may operate without unnecessarily anchoring media and wasting bandwidth belonging to a service provider. Since SBC 105 has been partially described, variations to the above will be discussed further below.

Figure 2:
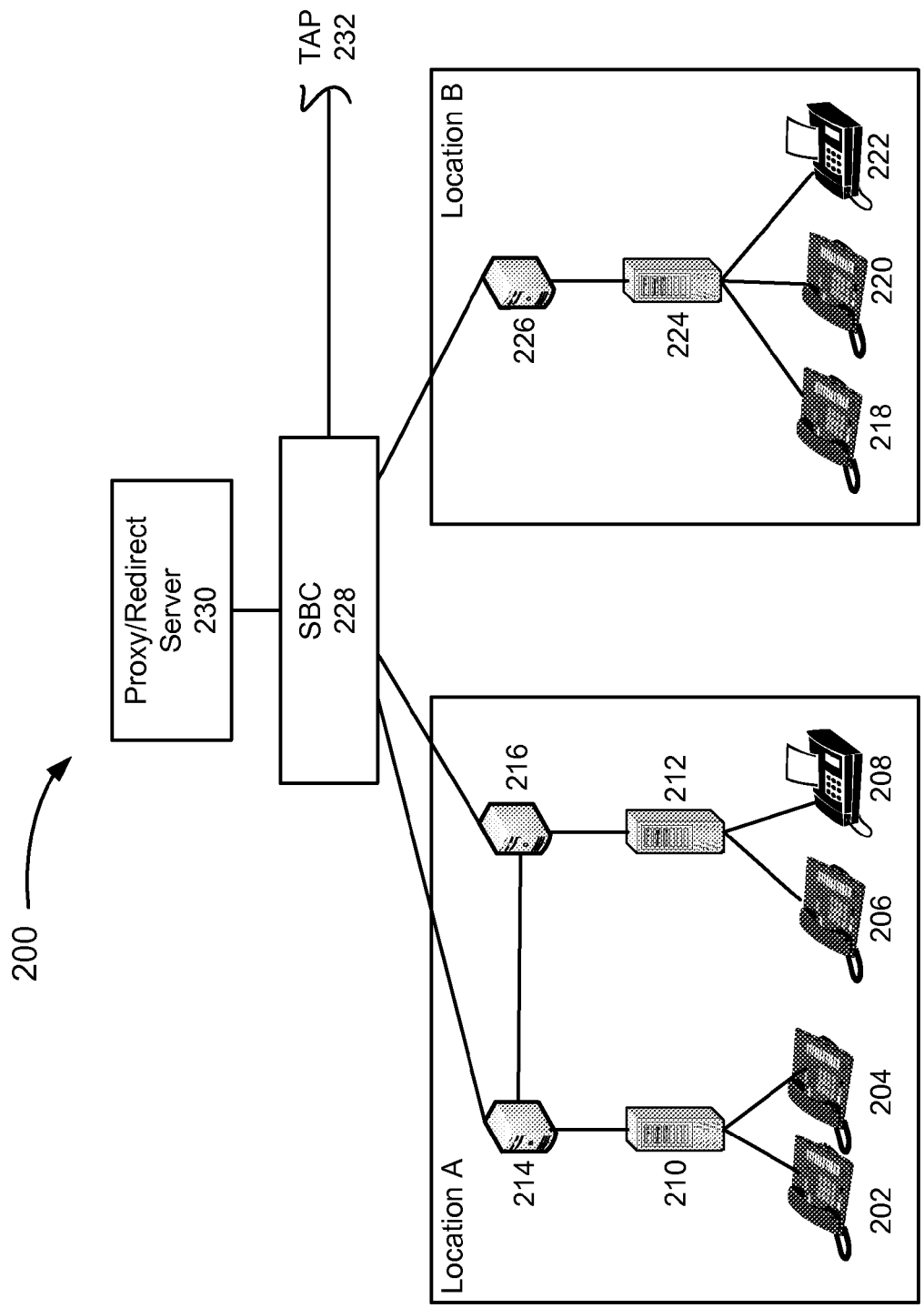
FIG. 2 is a diagram illustrating an exemplary environment in which systems and methods described herein may be implemented.

FIG. 2 is a diagram illustrating an exemplary environment 200 in which systems and methods described herein may be implemented. Environment 200 may include a Location A and a Location B. Location A may include endpoints 202, 204, 206, 208, PBXs 210, 212, and gateways 214 and 216, and Location B may include endpoints 218, 220, 222, a PBX 224, and a gateway 226. Additionally, environment 200 may include a SBC 228, a proxy/redirect server 230, and a tap 232, which may allow media to be diverted (e.g., to law enforcement agencies in accordance with the CALEA, network administrators for quality control or diagnostic testing, etc.).

In this example, Location A and Location B may be two separate buildings. The devices in Location A and Location B may be considered customer premises equipment (CPE), while SBC 228 and proxy/redirect server 230 may be considered service provider equipment. However, the devices of environment 200 may be owned and/or managed by anyone. For ease of description in reference to FIG. 2, endpoints 202, 204, 206, 208, 218, 220, and 222 of Location A and Location B may be referred to collectively as endpoint 202, PBXs 210, 212, and 224 of Location A and Location B may be referred to collectively as PBX 210, and gateway 214, 216, and 226 of Location A and Location B may be referred to collectively as gateway 214.

Endpoint 202 may include a device for transmitting or receiving media (e.g., voice or data). For example, endpoint 202 may include a legacy telephone or a facsimile machine that is not a VoIP-enabled device. For example, endpoint 202 may not be a SIP/Real Time Transport Protocol (RTP)-enabled device. Endpoint 202 may be an analog or a digital device. Endpoint 202 may connect to PBX 210 using, for example, copper wiring (e.g., twisted pair) via a phone jack.

PBX 210 may include a device for connecting endpoints to permit telephone calls and other types of data exchange. In addition to call setup and teardown, PBX 210 may include various calling features, such as auto dialing, call accounting, call transferring, conference calling, etc. PBX 210 may operate according to one or more interfaces (e.g., Plain Old Telephone System (POTS), Integrated Services Digital Network (ISDN), etc.) and/or protocols (QSIG, Digital Enhanced Cordless Telecommunications (DECT), proprietary, etc.). PBX 210 may connect to gateway 214 using, for example, a T1 trunk line. For example, the T1 trunk line may be a channelized T1 trunk line to provide ISDN Primary Rate Interface (PRI) services.

Gateway 214 may include a device that allows and/or controls access to another device or network. For example, gateway 214 may interconnect a customer location (e.g., Location A) to a service provider (e.g., SBC 228). Gateway 214 may perform various functions, such as protocol translation, impedance matching, rate conversion, signaling translation, routing, address translation, etc. As will be described below, gateway 214 may or may not be a device that registers with SBC 228 and/or server/redirect server 230 according to the SIP. Gateway 214 may connect to SBC 228 over, for example, a wide area network (WAN) link, to transmit and receive IP packets. Additionally, gateway 214 and gateway 216 may connect to each other.

SBC 228 may include a device that forms a border to and from a service provider network. SBC 228 may operate to meet requirements associated with the CALEA. SBC 228 may manage VoIP and other media at the border of an IP network. For example, SBC 228 may receive and respond to SIP and RTP messages to manage VoIP and other media services for Location A and Location B. SBC 228 may include one or more databases. In one implementation, SBC 228 may refer to a database for location information associated with registered endpoints and/or devices (e.g., SIP-enabled endpoints, such as IP telephones, personal computer with VoIP capability, a gateway, etc.). As will be described below in reference to FIG. 5, SBC 228 may communicate with proxy/redirect server 230 if SBC 228 does not have location information associated with endpoints and/or other devices.

Additionally, as will be described below in reference to FIG. 4, SBC 228 may include multiple configuration components. Although not illustrated, a provisioning link may exist to SBC 228 to allow, for example, a network operator or administrator to manage the configuration components of SBC 228 via a user interface (e.g. a command line interface (CLI), or a graphical user interface (GUI)). SBC 228 may connect to proxy/redirect server 230 over, for example, an IP link.

Proxy/Redirect server 230 may include a device that stores user location information for unregistered endpoints (e.g., static devices), such as endpoint 202. For example, proxy/redirect server 230 may employ telephone number mapping, location queries and/or static route designations to determine that an endpoint, such as endpoint 202 and/or a gateway, such as gateway 214, is in Location A or that endpoint 218 is in Location B. That is, as will be described below, proxy/redirect server 230 may redirect calls to SBC 228 once user location information is identified. Proxy/Redirect server 230 may also include security, call routing (e.g., static and dynamic registrations), call-forwarding, privacy, accounting, and/or stateful or stateless transaction capabilities. Tap 232 may include a connection to SBC 228 that allows a law enforcement agency to monitor media.

Although FIG. 2 illustrates exemplary environment 200, in other implementations, environment 200 may include fewer, additional, and/or different devices than depicted in FIG. 2. For example, SBC 228 may be connected to other devices not illustrated (e.g., a service provider gateway, a public switch telephone network (PSTN) class 5 or class 3 switch, a PSTN, etc.). Additionally, or alternatively, environment 200 may include, for example, SIP-enabled endpoints (e.g., an IP phone). Additionally, or alternatively, PBX 210 may be a different device, such as a key system device. Additionally, or alternatively, devices may be combined into a single device. For example, PBX 210 may be an IP-PBX, in which case gateway 214 may be unnecessary. Additionally, or alternatively a device may be implemented as two or more devices. For example, gateway 214 may not include routing functionality, in which case a routing device may exist between gateway 214 and SBC 228, and/or proxy/redirect server 230 may be implemented as two separate and distinct devices; a proxy device and a redirect device. Additionally, or alternatively, the connections between devices may be direct or indirect. Further, the connections may be, for example, wired and/or wireless.

Additionally, or alternatively, environment 200 may relate to SBC 228 linking two or more service provider networks. That is, SBC 228 may relate to other applications where diversion of media may be necessary.

Figure 3:
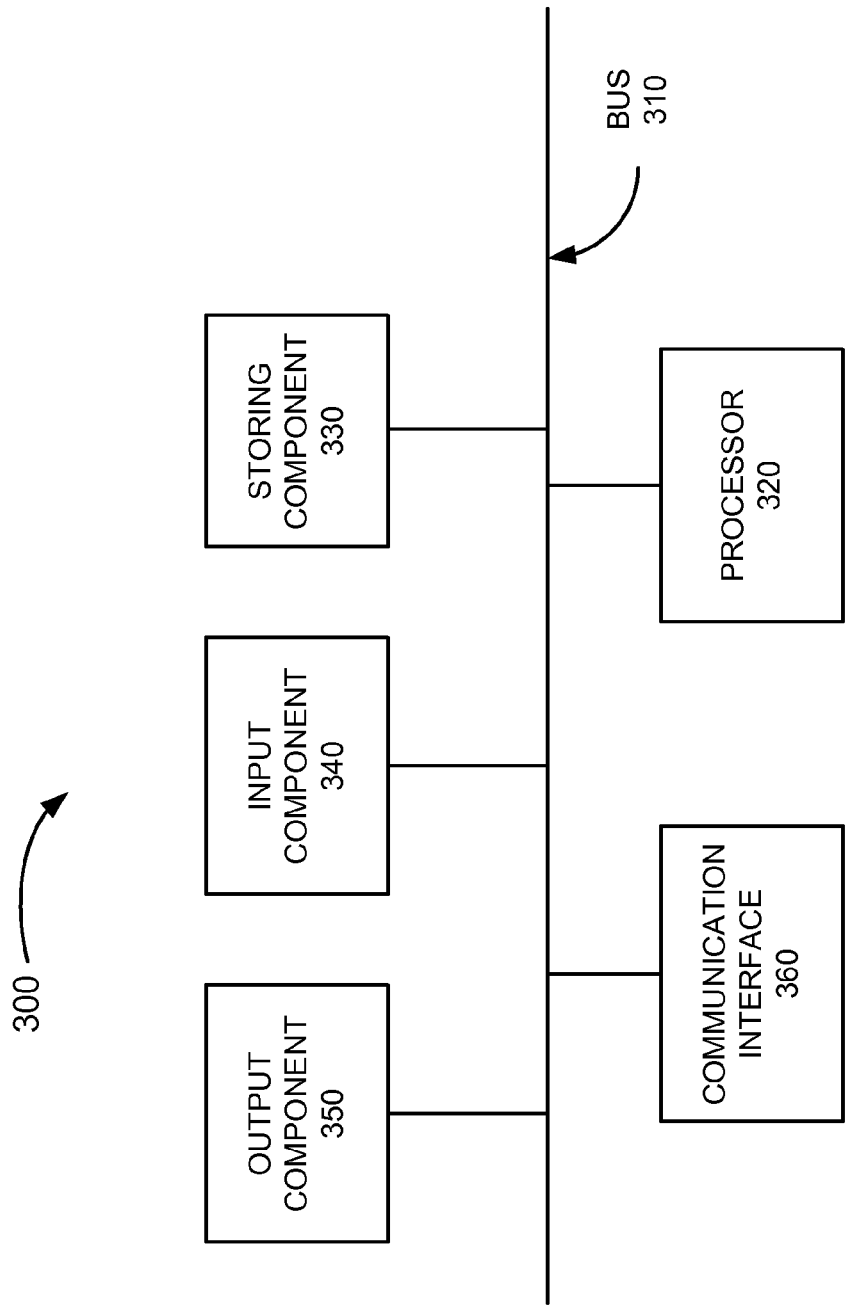
FIG. 3 is a diagram illustrating exemplary components that may correspond to one or more of the devices of the exemplary environment depicted in FIG. 2.

FIG. 3 is a diagram illustrating exemplary components of a device 300 that may correspond to one or more of the devices depicted in FIG. 2. For example, device 300 may correspond to endpoint 202, PBX 210, gateway 214, SBC 228 and/or proxy/redirect server 230. As illustrated, device 300 may include a bus 310, a processor 320, a storing component 330, an input component 340, an output component 350, and/or a communication interface 360.

Bus 310 may include a path that permits communication among the components of device 300. For example, bus 310 may include a system bus, an address bus, a data bus, and/or a control bus. Bus 310 may also include bus drivers, bus arbiters, bus interfaces, and/or clocks.

Processor 320 may include a general-purpose processor, a microprocessor, a data processor, a co-processor, a network processor, an application specific integrated circuit (ASIC), a controller, a programmable logic device, a chipset, a field programmable gate array (FPGA), or processing logic that may interpret and execute instructions. "Processing logic," as used herein, may include hardware, software, or a combination of hardware and software.

Storing component 330 may include any type of component that stores data and instructions related to the operation and use of device 300. For example, storing component 330 may include a memory component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. Additionally, storing component 330 may include a storage component, such as a magnetic storage component (e.g., a hard disk), a compact disc (CD), a digital versatile disc (DVD), or another type of computer-readable medium, along with a corresponding drive. Storing component 330 may also include an external storing component, such as a universal serial bus (USB) memory stick, a storage component, etc.

Input component 340 may include a mechanism that permits an operator to input information to device 300, such as a keyboard, a keypad, a button, a switch, voice recognition, etc. Output component 350 may include a mechanism that outputs information to the operator, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a radio interface, or the like.

As will be described in detail below, device 300 may perform certain operations relating to the concepts and services described herein. Device 300 may perform these operations in response to processor 320 executing software instructions contained in a computer-readable medium, such as storing component 330. A computer-readable medium may be defined as a physical or logical memory device.

The software instructions may be read into storing component 330 from another computer-readable medium or from another device via communication interface 360. The software instructions contained in storing component 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3 illustrates exemplary components of device 300, in other implementations, device 300 may include fewer, additional, and/or different components than those depicted in FIG. 3. In still other implementations, one or more components of device 300 may perform one or more other tasks described as being performed by one or more other components of device 300.

Figure 4:
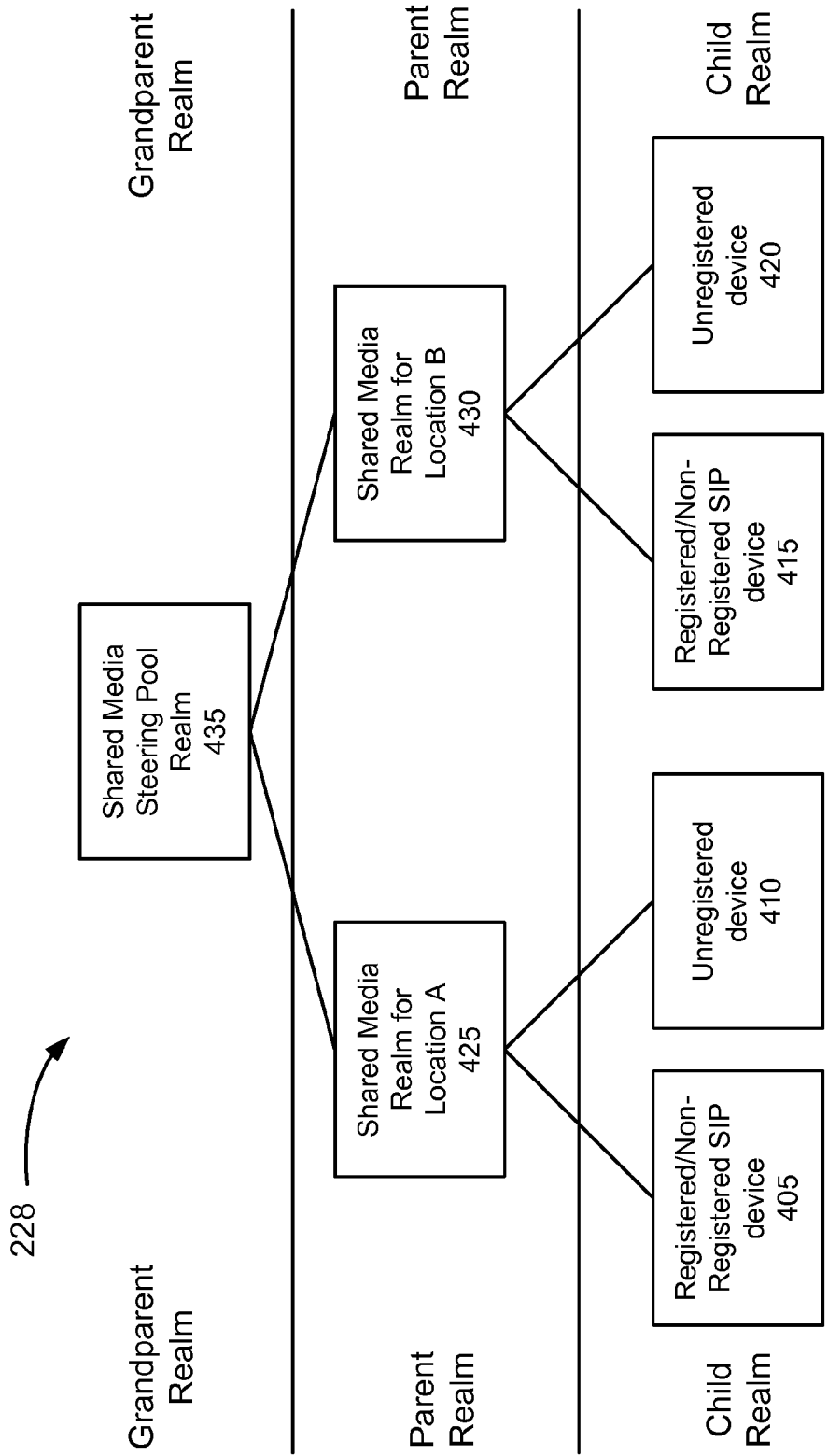
FIG. 4 is a diagram illustrating exemplary configuration components of the SBC depicted in FIG. 2.

FIG. 4 is a diagram illustrating exemplary configuration components that may be associated with the concepts described in relation to SBC 228. As illustrated, SBC 228 may include configuration components that operate in a grandparent realm, a parent realm, and a child realm, which will be described further below. For example, SBC 228 may include a registered/non-registered SIP device 405, an unregistered device 410, a registered/non-registered SIP device 415, an unregistered device 420, a shared media realm for Location A 425, a shared media realm for Location B 430, and a shared media steering pool realm 435.

In one implementation, each configuration component may be an object according to an object-oriented programming language (e.g., C or Java) in which one or more characteristics of the object may be inherited based on a hierarchy of a class(es), such as a grandparent realm, a parent realm and a child realm. Additionally, a class and/or an instance of a class (e.g., an object) may override one or more inherited characteristics. For example, as previously mentioned, although a configuration component, such as an object of the parent realm and/or the child realm may inherit a characteristic (e.g., to anchor media) of the grandparent realm, the object of the parent realm and/or the child realm may override such a characteristic (i.e., to release media). As will be described in greater detail below, in one implementation, for example, a configuration component of the parent realm, such as shared media realm for Location A 425, may override a characteristic of the grandparent realm based on determining that communicating endpoints are located in the same location.

Each of the configuration components may include configuration information for managing signaling and media exchange between two or more endpoints. For example, configuration information may include whether media is to be released or anchored, and/or IP addressing and port numbers. In the child realm, configuration components may correspond to configuration information associated with one or more customer premises equipment. For example, unregistered device 410 may correspond to configuration information associated with gateways 214 and 216 of Location A. Similarly, unregistered device 420 may correspond to configuration information associated with gateway 226 of Location B. Although not illustrated in FIG. 2, registered/non-registered SIP device 405 may correspond to configuration information associated with a SIP-enabled device in Location A, and registered/non-registered SIP device 415 may correspond to configuration information associated with a SIP-enabled device in Location B.

Although FIG. 4 illustrates exemplary configuration components of SBC 228, in other implementations, SBC 228 may include fewer, additional, and/or different configuration components than those depicted in FIG. 4. In still other implementations, configuration components may not inherit characteristics, but simply may include default settings that may be changed and/or reconfigured based on information received from other devices. Further, configuration components may correspond to more than one type of device (e.g., a SIP-enabled device and a non-SIP-enabled device). Additionally, or alternatively, unregistered device 410 may include a registered device.

Figure 5:
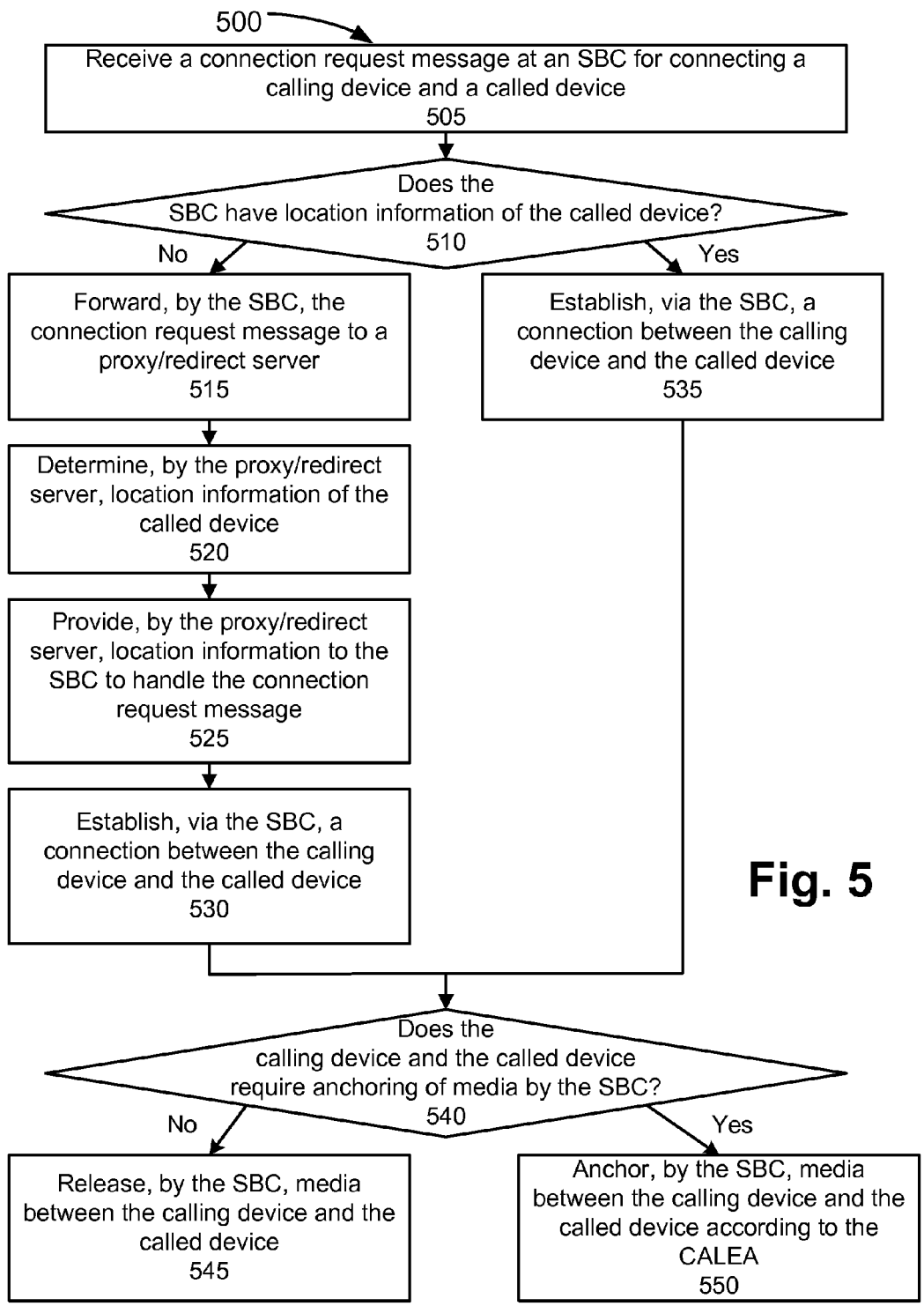
FIG. 5 is a flow diagram illustrating an exemplary process associated with the concepts described herein.

FIG. 5 is a flow diagram illustrating an exemplary process 500 associated with the concepts described herein. In addition to FIG. 5, process 500 will be described in reference to exemplary environment 200 illustrated in FIG. 2 and configuration components of SBC 228 illustrated in FIG. 4.

Process 500 may begin with receiving a connection request message at an SBC for connecting a calling device and a called device (block 505). For example, a user of endpoint 202 may dial a telephone number of endpoint 206 which may generate a connection request message to be received at PBX 210. PBX 210 may forward, for example, a corresponding ISDN-PRI signaling message to gateway 214. Gateway 214 may convert the ISDN-PRI signaling message to a SIP signaling request message (e.g., an invite message) and corresponding Session Description Protocol (SDP) information (e.g., address, port, media format, media release and/or media release disabled information). Gateway 214 may transmit the SIP invite message and corresponding SDP information in one or more IP packets to SBC 228.

In block 510, the SBC may determine whether it has location information of the called device. In one implementation, unregistered device 410 in the child realm of SBC 228 may receive the SIP invite message and SDP information from gateway 214. SBC 228 may determine if it has location information of endpoint 206 based on the telephone number or some other identifier of endpoint 206 contained in the SIP invite message or SDP information. For example, the SIP invite message and the SDP information may filter upward to shared media realm for Location A 425 of the parent realm and to shared media steering pool realm 435 of the grandparent realm of SBC 228.

The configuration components in each realm of SBC 228 may inspect the SIP invite message and the SDP information which later may be used to determine whether media release or media anchoring should be employed, as will be described below.

If SBC 228 determines that it does not have location information of the called device (block 510—NO), SBC 228 may forward the connection request message to a proxy/redirect server (block 515). That is, if SBC 228 does not have location information (e.g., address and/or port information) to forward the connection request message (i.e., the SIP invite message and the SDP information) to endpoint 206, SBC 228 may forward, for example, the connection request message, or a portion thereof, to another device, such as a proxy/redirect server 230. In one instance, SBC 228 may not have location information of the endpoint 206 if endpoint 206 is an unregistered device. In another instance, SBC 228 may not have location information of endpoint 206 even if endpoint 206 is a registered device. In either instance, SBC 228 may forward, for example, the connection request message, or a portion thereof, to proxy/redirect server 230.

In block 520, the proxy/redirect server may determine the location information of the called device. For example, proxy/redirect server 230 may determine the location information of endpoint 206 employing, for example, telephone number mapping, location queries and/or static route designations, based on the connection request message or a portion thereof.

In block 525, the proxy/redirect server may provide location information to the SBC to handle the connection request message. For example, proxy/redirect server 230 may provide SBC 228 with address and/or port information so that SBC 228 may forward the connection request message to the appropriate device, such as gateway 216.

In block 530, a connection between the calling device and the called device may be established via the SBC. For example, SBC 228 may forward the connection request message to endpoint 206 via gateway 216 and PBX 212 which may cause endpoint 206 to ring. If a user of endpoint 206 answers, an accept message from endpoint 206 may be sent to PBX 212. PBX 212 may forward the accept message to gateway 216. Gateway 216 may convert the accept message to a SIP message (e.g., a 200 OK SIP message) and corresponding SDP information (e.g., address, port, media format, media release, and/or media release disabled information). Gateway 216 may transmit the SIP accept message and corresponding SDP information in one or more IP packets to SBC 228 which may be forwarded to endpoint 202.

If SBC 228 determines that it does have location information of the called device (block 510—YES), a connection between the calling device and the called device may be established via the SBC (block 535). In one instance, SBC 228 may determine that it has location information. For example, if an endpoint is a registered device (e.g., a SIP device), SBC 228 may determine address and/or port information. Upon such determination, for example, the operations described in relation to block 530 may correspond to the remaining operations relating to block 535. Accordingly, these operations will not be described again.

In block 540, the SBC may determine whether the calling device and the called device require media to be anchored. For example, SBC 228 may determine whether endpoint 202 and 206 are in the same location or not in the same location based on the SIP/SDP signaling information. If SBC 228 determines that endpoint 202 and endpoint 206 do not require media to be anchored (block 540—NO), SBC 228 may release media between endpoint 202 and endpoint 206 (block 545). For example, shared media realm for Location A 425 may determine that endpoint 202 and endpoint 206 are both in Location A and that the respective SIP/SDP signaling information indicates media release. Alternatively, shared media realm for Location A 425 may determine that endpoint 202 and endpoint 206 are both in Location A, but that the SIP/SDP signaling from gateway 214 and/or gateway 216 may not indicate media release.

In one implementation, SBC 228 (e.g., shared media realm for Location A 425) may provide for media release. For example, in the instance that gateway 214 and/or gateway 216 may not indicate media release, shared media realm for Location A 425 may change, for example, the SDP signaling information to indicate media release. For example, shared media realm for Location A 425 may inspect the SDP signaling information and change one or more flag values to indicate media release. In the instance that SDP signaling information already indicates media release, shared media realm for Location A 425 may not perform this operation.

In either instance, although the grandparent realm may possess a default characteristic for anchoring media, shared media realm for Location A 425 may override this characteristic and release media. In this way, gateway 214 and gateway 216 may communicate to each other via the link illustrated in FIG. 2. For example, gateway 214 and gateway 216 may exchange voice information (VoIP packets) employing, for example, the RTP. In this way, bandwidth associated with the service provider's network may not be unnecessarily utilized.

If SBC 228 determines that the calling device and the called device require that media be anchored (block 540—YES), SBC 228 may anchor media (block 550). That is, if the calling device and the called device are in two different locations, then SBC 228 may determine that media should be anchored. For example, if a user of endpoint 202 called endpoint 218, SBC 228 may determine that media must be anchored to tap 232 to comply with the CALEA.

In one implementation, shared media steering pool realm 435 of the grandparent realm may determine that its children (i.e., shared media realm for Location A 425 and shared media release realm for Location B) correspond to the respective SDP signaling information associated with endpoint 202 and endpoint 218. That is, shared media steering pool realm 435 may determine that media is to be exchanged between two distinct location (e.g., Location A and Location B). Upon such determination, shared media steering pool realm 435 may anchor media to tap 232.

Although FIG. 5 illustrates an exemplary process 500, in other implementations, fewer, additional, or different processes may be performed. For example, in block 505, the connection request message may not relate to a telephone call, but another type of media connection request. Additionally, or alternatively, message other than a connection request and/or accept messages in which to provide a handshake between endpoints for purposes of establishing a connection (e.g., a media connection) may be employed. Additionally, or alternatively, the calling device and/or the called device may be a device other than a telephone, may be a registered device, etc. Additionally, or alternatively, devices, such as PBX 210 and/or gateway 214 may be different and/or the signaling between such devices may be different than that described above.

Additionally, or alternatively, although not specifically described, SBC 228 may manage signaling and media communication from an endpoint via a PSTN switch (as previously mentioned above) and an endpoint in Location A or Location B.

The foregoing description of implementations provides illustration, but is not intended to be exhaustive or to limit the implementations to the precise form disclosed. In this regard, the concepts described herein may have broader application. In addition, while a series of blocks has been described with regard to the process illustrated in FIG. 5, the order of the blocks may be modified in other implementations. Further, non-dependent blocks may be performed in parallel.

It will be apparent that the exemplary model described herein may be implemented in many different forms of software, firmware, and hardware in the implementations illustrated in the figures. The actual software code or specialized control hardware used to implement the exemplary model does not limit the invention. Thus, the operation and behavior of the exemplary model were described without reference to the specific software code—it being understood that software and control hardware can be designed to implement the exemplary model based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method comprising:
receiving, by a device, signaling information to establish a connection between a first endpoint and a second endpoint;
establishing, by the device, the connection between the first endpoint and the second endpoint based on the signaling information;
determining, by the device, whether the first endpoint and the second endpoint are located in a same location based on the signaling information;
determining, by the device and based on information associated with at least one of the first endpoint or the second endpoint, that media exchanged between the first endpoint and the second endpoint is required to be diverted to a different device associated with a law enforcement agency when the first endpoint and the second endpoint are not located in the same location; and
anchoring, by the device, the media to a tap associated with the law enforcement agency after determining that the media exchanged between the first endpoint and the second endpoint is required to be diverted to the different device associated with the law enforcement agency, the anchoring of the media to the tap allowing the law enforcement agency to monitor the media.

2. The method of claim 1, where receiving the signaling information comprises:
receiving first information, of the signaling information, from a first realm, the first realm being associated with the first endpoint; and
receiving second information of the signaling information, from a second realm, the second realm being associated with the second endpoint, and
the first realm being separate from the second realm.

3. The method of claim 1, further comprising:
receiving different signaling information to establish a different connection between the first endpoint and a third endpoint;
determining that the different signaling information indicates that media release is enabled; and
releasing different media, exchanged between the first endpoint and the third endpoint, when the first endpoint and the third endpoint are located in a same location and after determining that the different signaling information indicates that the media release is enabled.

4. The method of claim 1, further comprising:
receiving different signaling information to establish a different connection between the first endpoint and a third endpoint;
determining that the different signaling information indicates that media release is not enabled;
altering the different signaling information to indicate that the media release is enabled when the first endpoint and the third endpoint are located in a same location; and
releasing different media, exchanged between the first endpoint and the third endpoint, after altering the signaling information to indicate that the media release is enabled.

5. The method of claim 4, where altering the different signaling information comprises:
changing one or more flag values of the different signaling information to indicate that the media release is enabled.

6. The method of claim 1, where at least one of the first endpoint or the second endpoint is a non-session initiation protocol (SIP)-enabled device.

7. The method of claim 1, where releasing the media comprises:
releasing Voice-over-Internet Protocol (VoIP) packets.

8. A non-transitory computer-readable medium storing instructions, the instructions comprising:
one or more instructions that, when executed by at least one processor, cause the at least one processor to:
receive a connection request message, associated with a first endpoint, to establish a connection with a second endpoint;
receive an acceptance message associated with the second endpoint;
determine whether the first endpoint and the second endpoint are at a same customer premises;
determine that media exchanged between the first endpoint and the second endpoint is required to be diverted to a device associated with a law enforcement agency when the first endpoint and the second endpoint are not at the same customer premises; and
anchor the media to a tap after determining that the media exchanged between the first endpoint and the second endpoint is required to be diverted to the device associated with the law enforcement agency, the anchoring of the media to the tap allowing the law enforcement agency to monitor the media.

9. The non-transitory computer-readable medium of claim 8, where the first endpoint is a non-Session Initiation Protocol (SIP)-enabled device.

10. The non-transitory computer-readable medium of claim 8, where the instructions further comprise:
one or more instructions that, when executed by the at least one processor, cause the at least one processor to:
release different media by providing the different media to a different device that resides at the customer premises,
the different device providing a media connection between the first endpoint and the second endpoint.

11. The non-transitory computer-readable medium of claim 8, where the instructions further comprise:
one or more instructions that, when executed by the at least one processor, cause the at least one processor to:
release different media based on configuration objects having a hierarchical relationship,
the hierarchical relationship providing a basis for inheriting characteristics relating to releasing the different media.

12. The non-transitory computer-readable medium of claim 11, where the hierarchical relationship is based on a grandparent realm, a parent realm, and a child realm, and where at least one configuration object of the configuration objects resides in each of the grandparent realm, the parent realm, and the child realm.

13. The non-transitory computer-readable medium of claim 12, where the different media is exchanged between the first endpoint and a third endpoint, and where the at least one configuration object residing in the parent realm overrides an inherited characteristic to anchor the different media associated with the grandparent realm when the first endpoint and the third endpoint are at the same customer premises.

14. The non-transitory computer-readable medium of claim 8, where the instructions further comprise:
one or more instructions that, when executed by the at least one processor, cause the at least one processor to:
receive a different connection request message, associated with the first endpoint, to establish a connection with a third endpoint;
alter information contained in the different connection request message to indicate that different media, exchanged between the first endpoint and the third endpoint, is to be released when the first endpoint and the third endpoint are at the same customer premises; and
release the different media based on the altered information.

15. The non-transitory computer-readable medium of claim 8, where a first realm relates to the connection request message, where a second realm relates to the acceptance message, and where the first realm and the second realm are different in terms of at least one of an Internet Protocol address or a port number.

16. A device comprising:
a processor to:
receive a first message from a first realm;
receive a second message from a second realm;
use the first message and the second message to establish a connection between a first endpoint and a second endpoint;
determine whether the first endpoint and the second endpoint are located at a same customer premises;
determine, based on information associated with at least one of the first endpoint or the second endpoint, that media exchanged between the first endpoint and the second endpoint is required to be diverted to a different device associated with a law enforcement agency when the first endpoint and the second endpoint are not located at the same customer premises; and
anchor the media to a tap associated with the law enforcement agency after determining that the media exchanged between the first endpoint and the second endpoint is required to be diverted to the different device associated with the law enforcement agency,
the anchoring of the media to the tap allowing the law enforcement agency to monitor the media.

17. The device of claim 16, where the first endpoint and the second endpoint are non-session initiation protocol (SIP)-enabled telephones.

18. The device of claim 17, where the processor is further to:
identify the same customer premises based on a telephone number contained in the first message.

19. The device of claim 16, where the media comprises Voice-over Internet Protocol packets.

20. A system comprising:
one or more processors to:
determine whether a first endpoint and a second endpoint are in a same location;
determine, based on information associated with at least one of the first endpoint or the second endpoint, that media exchanged between the first endpoint and the second endpoint is required to be diverted to a device associated with a law enforcement agency when the first endpoint and the second endpoint are not located in the same location; and
anchor the media to a tap associated with the law enforcement agency after determining that the media exchanged between the first endpoint and the second endpoint is required to be diverted to the device associated with the third party,
the anchoring of the media to the tap allowing the law enforcement agency to monitor the media.

21. The system of claim 20, where the one or more processors are further to:
receive a request to establish a connection between the first endpoint and the second endpoint; and
establish the connection before the media is exchanged.

22. The system of claim 20, where the one or more processors are further to:
determine that the first endpoint and a third endpoint are in the same location; and
release different media exchanged between the first endpoint and the third endpoint after determining that the first endpoint and the third endpoint are in the same location.

* * * * *